United States Patent
Fukushima et al.

(10) Patent No.: US 9,601,862 B2
(45) Date of Patent: Mar. 21, 2017

(54) CHARGE CONNECTOR

(71) Applicant: YAZAKI CORPORATION, Tokyo (JP)

(72) Inventors: Hirotaka Fukushima, Shizuoka (JP); Satoshi Okuda, Shizuoka (JP); Tsutomu Sawada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/673,041

(22) Filed: Mar. 30, 2015

(65) Prior Publication Data
US 2015/0207261 A1 Jul. 23, 2015

Related U.S. Application Data

(63) Continuation of application No. PCT/JP2013/077090, filed on Oct. 4, 2013.

(30) Foreign Application Priority Data

Oct. 5, 2012 (JP) ................ 2012-222936

(51) Int. Cl.
*H01R 13/62* (2006.01)
*H01R 13/506* (2006.01)
(Continued)

(52) U.S. Cl.
CPC ........ *H01R 13/506* (2013.01); *B60L 11/1816* (2013.01); *H01R 13/516* (2013.01); *B60L 11/1818* (2013.01); *H01R 13/639* (2013.01)

(58) Field of Classification Search
CPC ............ H01R 2201/26; H01R 13/6315; H01R 13/62933; H01R 13/639; H01R 13/629
(Continued)

(56) References Cited

U.S. PATENT DOCUMENTS 5,967,830 A * 10/1999 Tsuji .................... H01R 13/506
439/467
6,123,569 A * 9/2000 Fukushima ......... B60L 11/1818
439/310
(Continued)

FOREIGN PATENT DOCUMENTS

JP 06-333633 A 12/1994
JP 2000-348815 A 12/2000
(Continued)

OTHER PUBLICATIONS

International Search Report of PCT/JP2013/077090 dated Dec. 17, 2013 [PCT/ISA/210].
(Continued)

*Primary Examiner* — Hien Vu
(74) *Attorney, Agent, or Firm* — Sughrue Mion, PLLC (57) ABSTRACT

A charge connector includes a connector case and a connector body. The connector case includes a pair of case split members to be coupled together. The connector body is housed in the connector case and includes charge terminals connected with electric wires and housed in a connector housing. The connector housing is provided with rotation direction regulation projections. The case split members are provided with rotation direction regulation holes that engage with the rotation direction regulation projections. The case split member is provided with a temporarily holding portion for holding the connector housing at a temporarily housed position. The connector housing is provided with a temporarily held portion at which the temporarily holding portion is locked.

4 Claims, 7 Drawing Sheets (51) Int. Cl.
*H01R 13/516* (2006.01)
*B60L 11/18* (2006.01)
*H01R 13/639* (2006.01)

(58) Field of Classification Search
USPC .................................. 439/34, 372, 310, 687
See application file for complete search history.

(56) References Cited

U.S. PATENT DOCUMENTS

| | | | | |
|---|---|---|---|---|
| 7,476,121 | B2* | 1/2009 | Tsuji | H01R 13/4223 |
| | | | | 439/465 |
| 8,128,440 | B2* | 3/2012 | Matsumoto | B60L 11/1818 |
| | | | | 439/731 |
| 8,597,046 | B2* | 12/2013 | Osawa | B60L 11/1818 |
| | | | | 439/469 |
| 2002/0137397 | A1 | 9/2002 | Little | |
| 2010/0197171 | A1 | 8/2010 | Matsumoto et al. | |

FOREIGN PATENT DOCUMENTS

| | | |
|---|---|---|
| JP | 2001-015201 A | 1/2001 |
| JP | 2008-293810 A | 12/2008 |
| JP | 2010-182471 A | 8/2010 |
| JP | 2011-048945 A | 3/2011 |
| JP | 2012-511805 A | 5/2012 |
| WO | 2010/068293 A1 | 6/2010 |

OTHER PUBLICATIONS

Communication dated Apr. 26, 2016, from the European Patent Office in counterpart European Application No. 13843148.1.
Communication dated May 24, 2016, from the Japanese Patent Office in counterpart application No. 2012-222936.

* cited by examiner

CHARGE CONNECTOR

CROSS REFERENCE TO RELATED APPLICATION

This is a continuation application based on PCT application No. PCT/JP2013/077090 filed on Oct. 4, 2013, which claims the benefit of priority from Japanese Patent Application No. 2012-222936 filed on Oct. 5, 2012, the entire contents of which are incorporated by reference herein.

BACKGROUND OF THE INVENTION

1. Field of the Invention

The present invention relates to a charge connector used for charging a battery mounted on a vehicle such as an electric vehicle and a hybrid electric vehicle.

2. Description of the Related Art

Conventionally, a charge connector is used for charging a battery mounted on a vehicle such as an electric vehicle (EV) and a hybrid electric vehicle (HEV) (refer to Japanese Unexamined Patent Application Publication No. 2010-182471). An example of such a charge connector will be described below with reference to FIG. 1.

Figure 1:
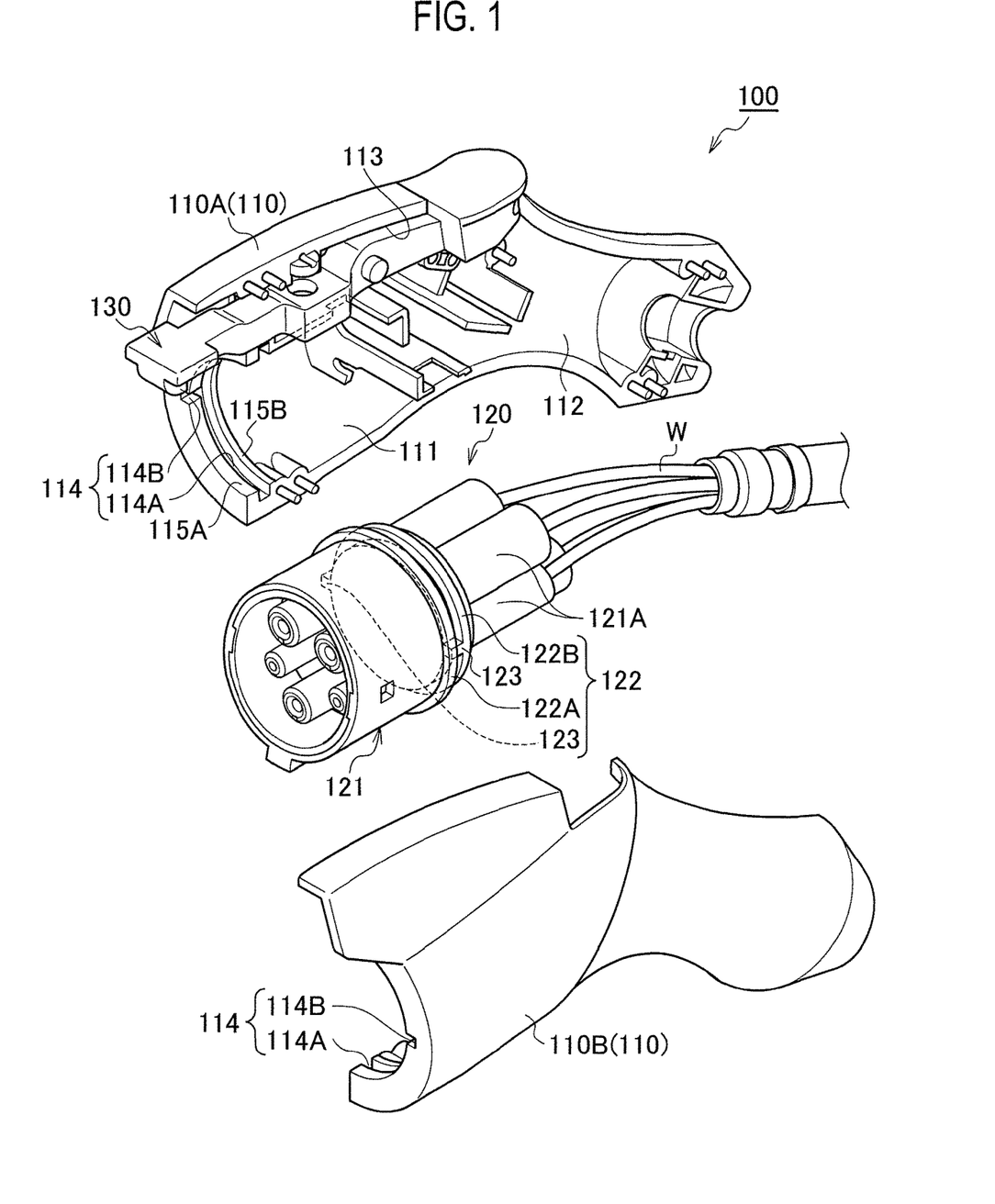
FIG. 1 is an exploded perspective view of a conventional charge connector (an exploded view showing both sides of a case body).

A conventional charge connector 100 shown in FIG. 1 includes a connector case 110 formed of a pair of case split members 110A, 110B to be coupled together, a connector body 120 housed in the connector case 110 and including a plurality of charge terminals (not shown in FIG. 1) connected with electric wires W and housed in a connector housing 121, and a lock mechanism 130 capable of preventing a mating connector (not shown in FIG. 1) and the connector body 120 fitted together from separating from each other.

The connector case 110 includes a housing holding portion 111 for housing the connector housing 121 of the connector body 120, an electric wire housing portion 112 for housing the electric wires W connected to the charge terminals (not shown in FIG. 1) in the connector body 120, and a lock housing portion 113 for housing the lock mechanism 130 above the housing holding portion 111 and the electric wire housing portion 112.

The housing holding portion 111 is provided with positioning recesses 114. The positioning recesses 114 include an axial direction regulation groove 114A formed between two axial direction regulation ribs 115A, 115B elongated along the opening at the front end of the housing holding portion 111, and include rotation direction regulation holes 114B formed on the axial direction regulation rib 115A.

Part of the electric wire housing portion 112 serves as a handle that an operator holds. The electric wires W connected to the charge terminals (not shown in FIG. 1) in the connector body 120 are drawn outward from the housing holding portion 111 through the electric wire housing portion 112.

The connector body 120 includes the plural charge terminals (not shown in FIG. 1) connected to mating terminals of the mating connector (not shown in FIG. 1) and the connector housing 121 in which a plurality of terminal housing portions 121A housing the respective charge terminals are arranged at intervals in the circumferential direction of the connector housing 121.

The connector housing 121 is provided with positioning projections 122 that engage with the positioning recesses 114. The positioning projections 122 include two elongated fit ribs 122A, 122B placed in front of the axial direction regulation rib 115A and in the axial direction regulation groove 114A, respectively, and rotation direction regulation projections 123 formed between the two elongated fit ribs 122A, 122B to engage with the rotation direction regulation holes 114B.

At the time of assembling the charge connector 100 described above, the connector body 120 is first inserted into one case split member 110A in a manner such that the positioning portions 122 engage with the positioning recesses 114 of the one case split member 110A so that the connector housing 121 is located at a temporarily housed position. This regulates a movement in an axial direction and a rotation in a rotation direction of the connector housing 121 in the one case split member 110A.

Next, while the positioning recesses 114 of the other case split member 110B engage with the positioning projections 122, the edge of the one case split member 110A is brought into contact with the edge of the other case split member 110B.

Thereafter, the respective case split members 110A, 110B are fixed with, for example, bolts and nuts so as to complete the assembly of the charge connector 100 in the state where the movement of the connector housing 121 (the movement in the axial direction and the rotation in the rotation direction) in the connector case 110 is regulated.

However, the conventional charge connector 100 described above has a problem that the engagement between the rotation direction regulation holes 114B and the rotation direction regulation projections 123 is released because the connector housing 121 located at the temporarily housed position in the one case split member 110A rises up from the one case split member 110A due to external force such as tensile force of the electric wires W. As a result, the operator is required to hold and keep the connector housing 121 at the temporarily housed position in the one case split member 110A to assemble the charge connector 100, which complicates the operation of assembling the charge connector 100.

SUMMARY OF THE INVENTION

The present invention has been made in order to solve the above-mentioned problem. An object of the present invention is to provide a charge connector capable of reliably holding a connector housing at a temporarily housed position in one case split member so as to improve operability of assembly of the charge connector.

A first aspect of the present invention is to provide a charge connector including: a connector case including a plurality of case split members to be attached together; and a connector body housed in the connector case and including one or more charge terminals connected with electric wires and housed in a connector housing, wherein one of the plural case split members and the connector housing is provided with a positioning portion, another one of the plural case split members and the connector housing is provided with a portion to be positioned that engages with the positioning portion, the connector body is inserted into one case split member in a manner such that the positioning portion engages with the portion to be positioned so that the connector housing is located at a temporarily housed position, the one case split member temporarily housing the connector housing is attached with another case split member, one of the one case split member and the connector housing is provided with a temporarily holding portion for keeping the connector housing at the temporarily housed position, and another one of the one case split member and the connector housing is provided with a temporarily held portion at which the temporarily holding portion is locked.

According to a second aspect of the present invention, the temporarily holding portion includes a base end fixed to the one case split member and a free end, the temporarily holding portion allows the connector housing to be inserted into the temporarily housed position in the one case split member, and the temporarily holding portion is locked at the temporarily held portion with the connector housing located at the temporarily housed position.

According to a third aspect of the present invention, the number of the charge terminals is two or more, the connector housing includes two or more of terminal housing portions housing the respective two or more of the charge terminals and arranged at intervals in a circumferential direction of the connector housing, and the temporarily held portion is a step formed on a circumferential surface of one of the terminal housing portions.

According to the aspects of the present invention, since the temporarily holding portion is locked at the temporarily held portion in a state where the connector housing is located at the temporarily housed position in the one case split member, an operator can keep the connector housing at the temporarily housed position in the one case split member so as to improve the operability of assembly of the charge connector.

DESCRIPTION OF THE EMBODIMENTS

Hereinafter, a charge connector according to the present invention will be described below with reference to the drawings. Here, the same or similar elements in the following descriptions of the drawings are indicated by the same or similar reference numerals. It should be noted that the respective elements are schematically shown in the drawings, and dimensional ratios in the drawings are different from actual ratios. The specific dimensions thus should be taken into consideration in accordance with the following descriptions. In addition, the respective drawings may include the elements which are equivalent but differ in dimensional ratio.

(Configuration of Charge Connector)

Figure 2:
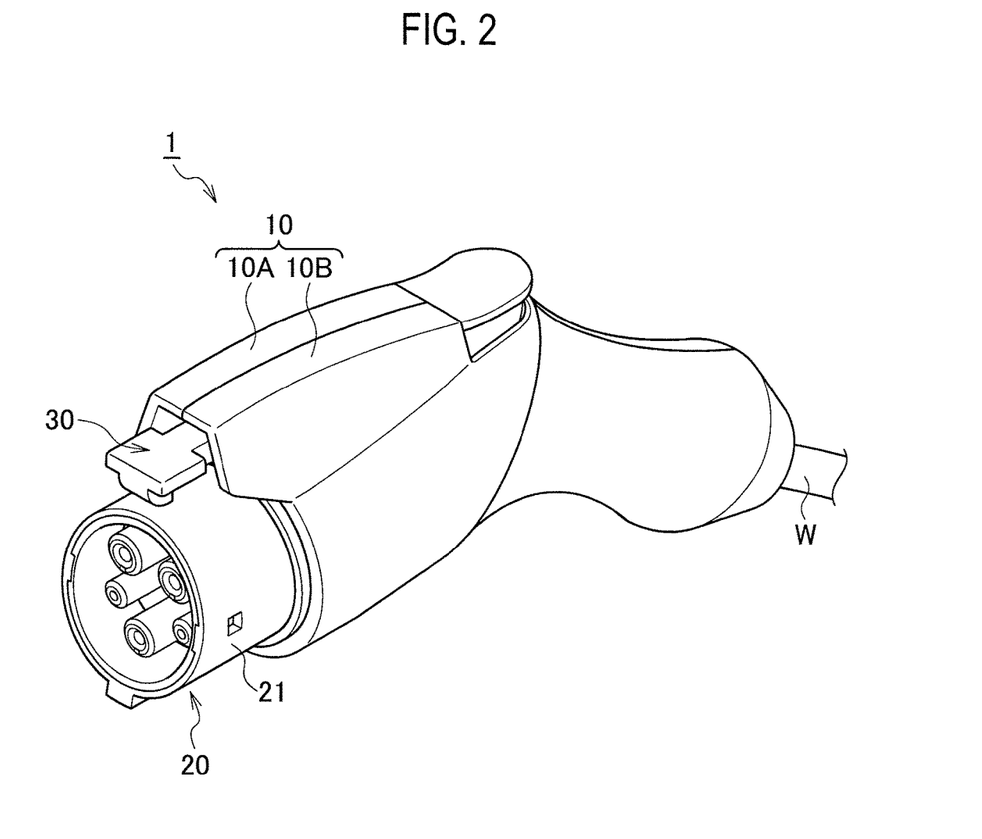
FIG. 2 is a perspective view showing a charge connector according to the present embodiment.
Figure 3:
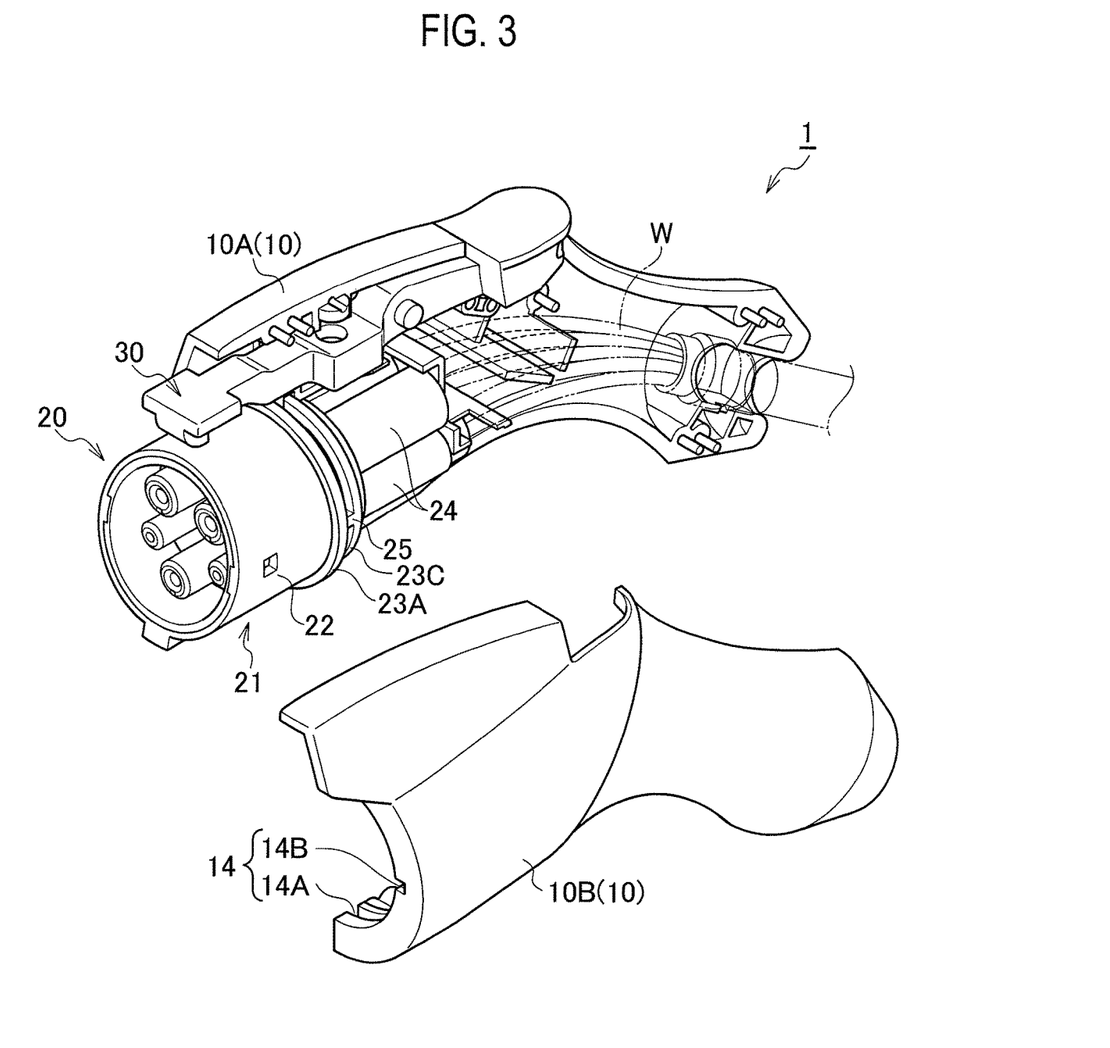
FIG. 3 is an exploded perspective view showing the charge connector (an exploded view showing one side of a case member) according to the present embodiment.
Figure 4:
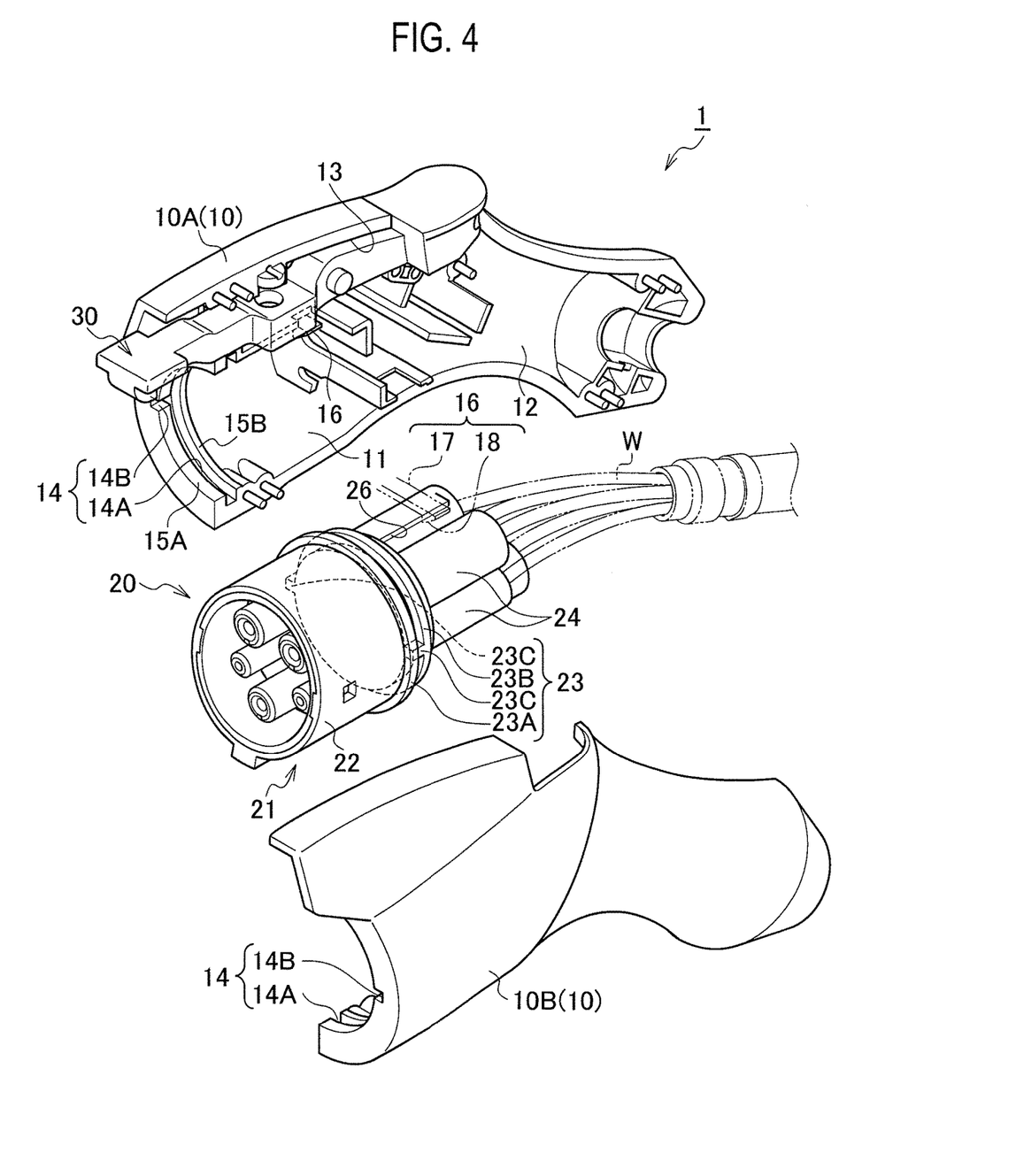
FIG. 4 is an exploded perspective view showing the charge connector (an exploded view showing both sides of the case member) according to the present embodiment.
Figure 5:
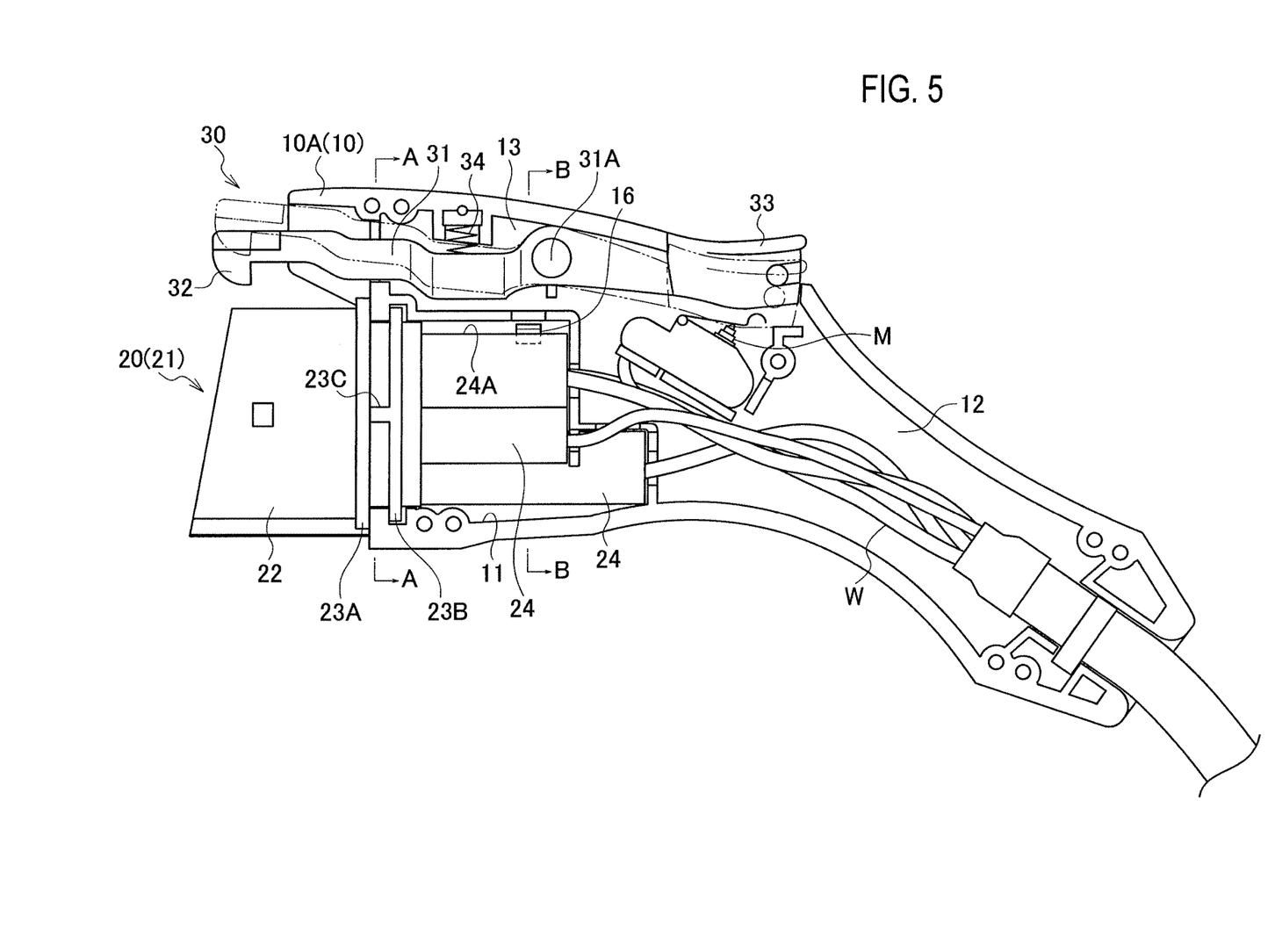
FIG. 5 is a cross-sectional view showing the inside of the charge connector according to the present embodiment.
Figure 6A:
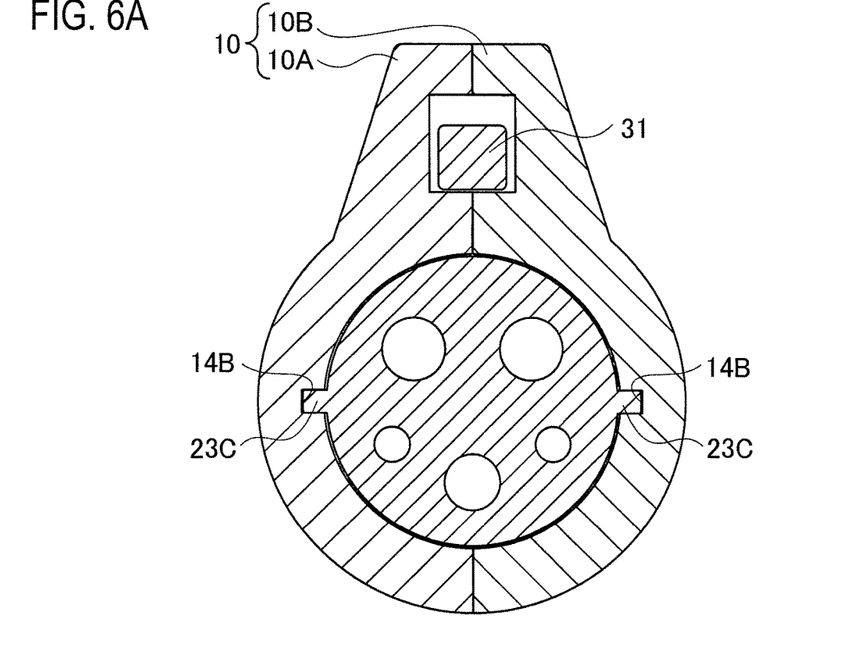
FIG. 6A is a cross-sectional view taken along line A-A in FIG. 5.
Figure 6B:
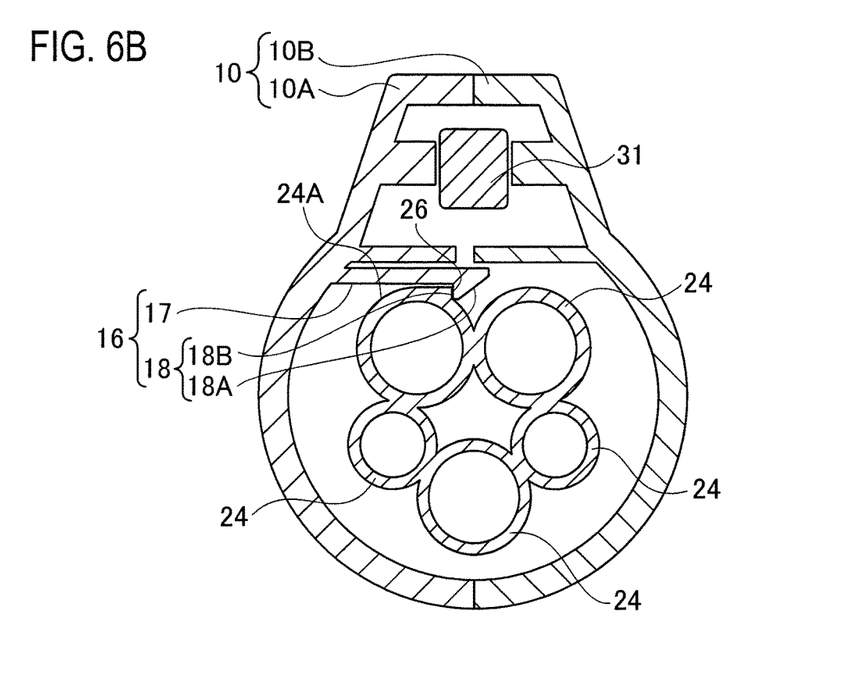
FIG. 6B is a cross-sectional view taken along line B-B in FIG. 5.

First, a configuration of a charge connector 1 according to the present embodiment will be described below with reference to the drawings. FIG. 2 is a perspective view showing the charge connector according to the present embodiment. FIG. 3 and FIG. 4 are exploded perspective views each showing the charge connector according to the present embodiment. FIG. 5 is a cross-sectional view showing the inside of the charge connector 1 according to the present embodiment. FIG. 6A is a cross-sectional view taken along line A-A in FIG. 5. FIG. 6B is a cross-sectional view taken along line B-B in FIG. 5.

As shown in FIG. 2 to FIG. 4, the charge connector 1 is configured to be fitted to a mating connector (a charge inlet device) provided with mating terminals. The charge connector 1 includes a connector case 10 formed of a pair of case split members 10A, 10B to be coupled together, a connector body 20 housed in the connector case 10 and including a plurality of charge terminals (not shown in the drawings) connected with electric wires W and housed in a connector housing 21, and a lock mechanism 30 capable of preventing the mating connector (not shown in the drawings) and the connector body 20 fitted together from separating from each other.

As shown in FIG. 4 and FIG. 5, the connector case 10 includes a housing holding portion 11 for housing the connector housing 21, an electric wire housing portion 12 for housing the electric wires W connected to the charge terminals (not shown in the drawings), and a lock housing portion 13 for housing the lock mechanism 30 above the housing holding portion 11 and the electric wire housing portion 12.

As shown in FIG. 4 and FIG. 6A, the housing holding portion 11 is provided with positioning recesses 14 each serving as a portion to be positioned. The positioning recesses 14 include an axial direction regulation groove 14A formed between two axial direction regulation ribs 15A, 15B elongated along the opening at the front end of the housing holding portion 11, and includes rotation direction regulation holes 14B formed on one axial direction regulation rib 15A.

The housing holding portion 11 in one case split member 10A is provided with a temporarily holding portion 16 for holding the connector housing 21 at a temporarily housed position. Here, the temporarily housed position of the connector housing 21 is a position where a rotation direction regulation projection 23C (to be described below) of the connector housing 21 temporarily engages with the rotation direction regulation hole 14B when the connector housing 21 is inserted in the case split member 10A.

As shown in FIG. 5 and FIG. 6B, the temporarily holding portion 16 includes an elastic arm 17 having a base end fixed on the inner surface of the case split member 10A and a free end at the tip thereof, and includes a claw 18 located at the tip of the elastic arm 17 and extending toward the connector housing 21.

The elastic arm 17 is bent and deformed so as to allow the connector housing 21 to be inserted into the temporarily housed position in the case split member 10A. The claw 18 includes an inclined surface 18A and a locked surface 18B to be locked at a temporarily held portion 26 (to be described below) of the connector housing 21 (see FIG. 6B, FIG. 7A and FIG. 7B).

The housing holding portion 11 described above is provided with the electric wire housing portion 12 on the rear side thereof. Part of the electric wire housing portion 12 serves as a handle that an operator holds. The electric wires W connected to the charge terminals (not shown in the drawings) of the connector body 20 are drawn outward from the housing holding portion 11 through the electric wire housing portion 12.

As described above, the connector body 20 includes the plural charge terminals (not shown in the drawings) connected to the mating terminals of the mating connector (not shown in the drawings) and the connector housing 21 formed into a cylindrical shape housing the plural charge terminals.

As shown in FIG. 3 to FIG. 5, the connector housing 21 includes an external hood 22 exposed to the outside of the connector case 10 so as to be fitted to the mating connector (not shown in the drawings), and includes a plurality of terminal housing portions 24 extending from the inside of the external hood 22 toward the inner space of the connector case 10.

The external hood 22 is provided, at the rear edge thereof, with positioning projections 23 each serving as a positioning portion to engage with the positioning recesses 14. The positioning projections 23 include two elongated fit ribs 23A, 23B placed in front of the axial direction regulation rib 15A and in the axial direction regulation groove 14A, respectively, and rotation direction regulation projections 23C formed between the two elongated fit ribs 23A, 23B to engage with the rotation direction regulation holes 14B.

The plural terminal housing portions 24 house the respective plural charge terminals (not shown in the drawings) and are arranged at intervals in the circumferential direction of the connector housing 21. One of the terminal hosing portions 24 formed into a cylindrical shape has an arc-like circumferential surface 24A. The circumferential surface 24A is provided with the temporarily held portion 26 at which the claw 18 (the locked surface 18B) of the temporarily holding portion 16 is to be locked. The temporarily held portion 26 is a step integrated with the top of the arc-like circumferential surface 24A.

The lock mechanism 30 prevents the mating connector (not shown in the drawings) and the connector housing 21 fitted together from separating from each other. As shown in FIG. 5, the lock mechanism 30 includes a lock arm 31, a lock claw 32 formed at the front end of the lock arm 31 to engage with the mating connector (not shown in the drawings), a lock operating portion 33 formed at the rear end of the lock arm 31 and used by the operator to operate the lock arm 31, and a coil spring 34 biasing the lock arm 31 toward a lock position (indicated by the solid lines in FIG. 5).

The lock arm 31 is formed to be swingable about a swing fulcrum 31A between the lock position (indicated by the solid lines in FIG. 5) where the lock claw 32 engages with the mating connector (not shown in the drawings) and a release position (indicated by the two-dot chain lines in FIG. 5) where the engagement between the mating connector and the lock claw 32 is released. The lock claw 32 and the lock operating portion 33 are exposed to the outside of the connector case 10. The lock operating portion 33 is operated so as to turn ON/OFF a micro switch M (see FIG. 5).

(Assembly of Charge Connector)

Figure 7A:
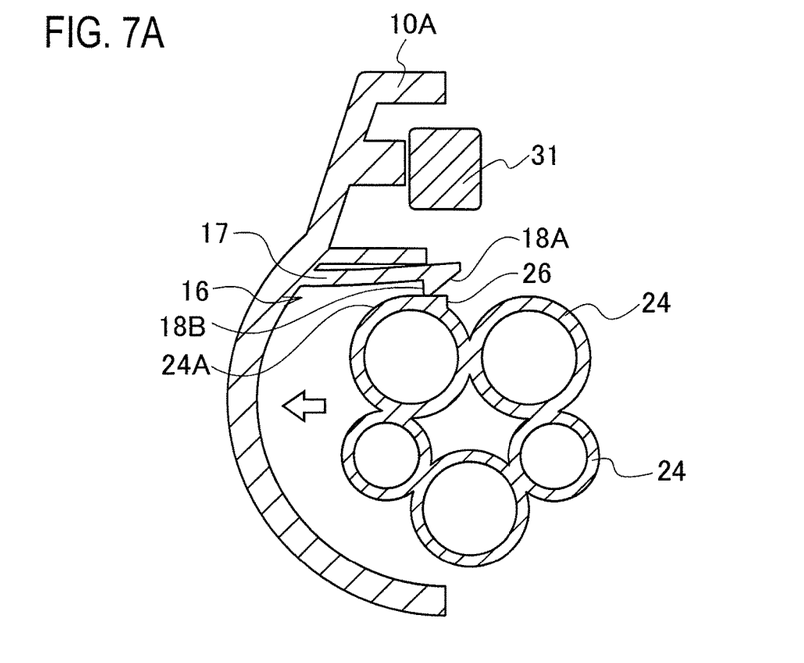
FIG. 7A is a cross-sectional view showing a process of assembling the charge connector according to the present embodiment.
Figure 7B:
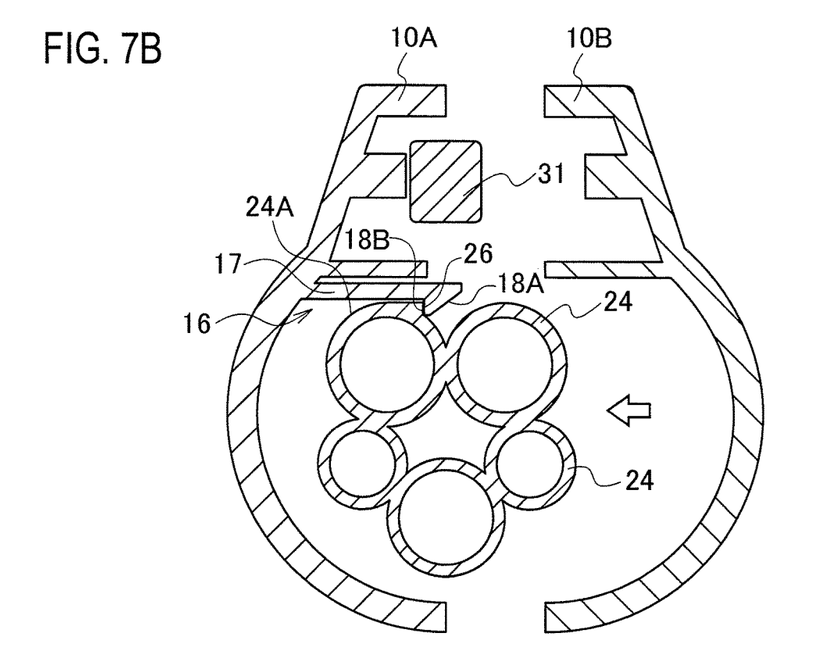
FIG. 7B is a cross-sectional view showing the process of assembling the charge connector according to the present embodiment.

Next, the assembly of the charge connector 1 described above will be described below with reference to the drawings. FIG. 7A and FIG. 7B are cross-sectional views each showing a process of assembling the charge connector 1 according to the present embodiment.

As shown in FIG. 7A, the connector body 20 and the lock mechanism 30 are first inserted in the one case split member 10A. Namely, the connector housing 21 is housed in the housing holding portion 11 of the one case split member 10A while one fit rib 23B is inserted into the axial direction regulation groove 14A of the one case split member 10A. At the same time, the electric wires W are housed in the electric wire housing portion 12, and the lock mechanism 30 is housed in the lock housing portion 13 (so as to be brought to the state as shown in FIG. 3 or FIG. 5).

Then, as shown in FIG. 7A, the claw 18 (the inclined surface 18A) of the temporarily holding portion 16 comes into contact with the circumferential surface 24A of the terminal housing portion 24, and the elastic arm 17 of the temporarily holding portion 16 is elastically deformed. Subsequently, as shown in FIG. 7B, the connector body 20 is further inserted into the one case split member 10A in a manner such that the rotation direction regulation projection 23C engages with the rotation direction regulation hole 14B of the one case split member 10A, so that the connector housing 21 is located at the temporarily housed position, and the elastic arm 17 returns to the original state so that the claw 18 of the temporarily holding portion 16 is locked at the temporarily held portion 26.

Accordingly, the connector housing 21 is prevented from rising up from the one case split member 10 so that the engagement between the rotation direction regulation hole 14B and the rotation direction regulation projection 23C is prevented from being released.

At the temporarily housed position, the positioning projections 23 engage with the positioning recesses 14 of the one case split member 10A. In particular, the rotation direction regulation projection 23C engages with the rotation direction regulation hole 14B so as to regulate the rotation in the rotation direction of the connector housing 21 in the one case split member 10A. In addition, the one fit rib 23B is inserted into the axial direction regulation groove 14A so as to regulate the movement in the axial direction of the connector housing 21 in the one case split member 10A.

Thereafter, as shown in FIG. 7B, while the positioning recesses 14 of the other case split member 10B engage with the positioning projections 23, the edge of the one case split member 10A is brought into contact with the edge of the other case split member 10B (see FIG. 6B).

The respective case split members 10A, 10B are then fixed with, for example, bolts and nuts so as to complete the assembly of the charge connector 1 in the state where the movement of the connector housing 21 (the movement in the axial direction and the rotation in the rotation direction) in the connector case 10 is regulated.

(Effects)

According to the present embodiment described above, the temporarily holding portion 16 (the claw 18) is locked at the temporarily held portion 26 in the state where the connector housing 21 is located at the temporarily housed position in the one case split member 10A. As a result, the engagement between the rotation direction regulation hole 14B and the rotation direction regulation projection 23C can be prevented from being released while the connector housing 21 is prevented from rising up from the one case split member 10A caused by external force such as tensile force of the electric wires W. Thus, the connector housing 21 can reliably be held at the temporarily housed position in the one case split member 10A, so as to improve the operability of assembly of the charge connector 1 without the operator required to hold and keep the connector housing 21 at the temporarily housed position when assembling the charge connector 1.

According to the present embodiment, the temporarily holding portion 16 and the temporarily held portion 26 are locked together when the connector housing 21 is inserted in the one case split member 10A so as to be located at the temporarily housed position. Namely, the temporarily holding portion 16 is locked at the temporarily held portion 26 only in a manner such that the operator inserts the connector housing 21 into the one case split member 10A.

According to the present embodiment, the temporarily held portion 26 is a step integrated with the arc-like circumferential surface 24A. This configuration facilitates the formation of the temporarily held portion 26 by use of the circumferential surface 24A of the terminal housing portion 24.

(Other Embodiments)

Although the details of the present invention have been disclosed by way of the embodiment described above, the present invention should not be deemed to be limited to the descriptions and the drawings composing part of the disclosure. It will be apparent to those skilled in the art from the disclosure that various alternative embodiments, examples and implementations can be made.

For example, the embodiment of the present invention may be subjected to modification as follows. The projection-recess relationship between the positioning recesses 114 and the positioning projections 122 may be opposite to each other. Similarly, the configuration relationship between the temporarily holding portion 16 and the temporarily held portion 26 may be opposite to each other.

The present invention can, of course, include various embodiments not described in this specification. Therefore, the scope of the present invention is defined only by the appropriate features according to the claims in view of the descriptions made above.

What is claimed is:

1. A charge connector comprising:
a connector case including a first case split member and a second case split member configured to be attached together; and
a connector body housed in the connector case, the connector body including a connector housing positioned at a front portion of the connector body, and two or more charge terminals connected with electric wires, the two or more charge terminals being housed in the connector housing,
wherein
one of the first case split member and the connector housing is provided with at least one positioning projection, and
the other one of the first case split member and the connector housing is provided with at least one positioning recess configured to receive the at least one positioning projection,
wherein the connector body is inserted into the first case split member such that the at least one positioning projection engages with the at least one positioning recess so that the connector body is located in a temporarily housed position within the first case split member, and
wherein
one of the first case split member and the connector body is further provided with a temporarily holding portion, and
the other one of the first case split member and the connector body is further provided with a temporarily held portion to which the temporarily holding portion is locked to maintain the connector housing in the temporarily housed position,
wherein
the connector housing includes two or more terminal housing portions, each configured to house a respective charge terminal of the two or more of the charge terminals, the two or more terminal housing portions being arranged at intervals in a circumferential direction of the connector housing, and
the temporarily held portion comprises a step formed on a circumferential surface of one of the terminal housing portions and the temporarily holding portion comprises an arm.

2. The charge connector according to claim 1, wherein:
the temporarily holding portion includes a base end fixed to the first case split member and a free end;
the temporarily holding portion allows the connector housing to be inserted into the temporarily housed position in the first case split member; and
the temporarily holding portion is locked to the temporarily held portion with the connector housing located in the temporarily housed position.

3. A charge connector assembly comprising:
a connector case comprising a first case split member and a second case split member configured to be attached together;
a connector body configured to be housed in the connector case and to receive at least one charge terminal,
wherein
one of the first case split member and the connector body comprises at least one positioning projection, and
the other one of the first case split member and the connector body comprises at least one positioning recess configured to receive the at least one positioning projection,
wherein the connector body is further configured to be inserted into the first case split member such that the at least one positioning projection engages with the at least one positioning recess so that the connector body is in a temporarily housed position within the first case split member,
wherein
one of the first case split member and the connector body further comprises a temporarily holding portion,
the other one of the first case split member and the connector body further comprises a temporarily held portion, and
the temporarily holding portion is configured to engage the temporarily held portion to secure the connector body in the temporarily housed position,
wherein the first case split member is configured to attach to the second case split member while the connector body is in the temporarily housed position, and
wherein
the connector body comprises a plurality of terminal housing portions, each configured to house a respective charge terminal of a plurality of charge terminals, the plurality of terminal housing portions being arranged at intervals in a circumferential direction of the connector body, and
the temporarily held portion comprises a step formed on a circumferential surface of one terminal housing portion of the plurality of terminal housing portions and the temporarily holding portion comprises an arm.

4. The charge connector assembly according to claim 3, wherein:
the first case split member comprises the temporarily holding portion, the temporary holding portion comprises a base end fixed to the first case split member and a free end, and
the free end of the temporary housing portion is configured to engage the temporarily held portion to lock the connector body in the temporarily housed position.

* * * * *